United States Patent
Ando

(10) Patent No.: US 6,845,911 B2
(45) Date of Patent: Jan. 25, 2005

(54) OPTICAL READER

(75) Inventor: Koichi Ando, Kamakura (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 225 days.

(21) Appl. No.: 10/289,179

(22) Filed: Nov. 7, 2002

(65) Prior Publication Data

US 2004/0089718 A1 May 13, 2004

(51) Int. Cl.$^7$ ................................................ G06K 7/10
(52) U.S. Cl. ...................................................... 235/454
(58) Field of Search ................................ 235/454, 455, 235/462.32; 358/474

(56) References Cited

U.S. PATENT DOCUMENTS

| | | | |
|---|---|---|---|
| 4,954,862 A | * 9/1990 | Lee et al. ................. | 355/402 |
| 6,700,683 B1 | * 3/2004 | Hashizume ................ | 358/461 |

FOREIGN PATENT DOCUMENTS

| | | | | |
|---|---|---|---|---|
| JP | 06177004 A | * 6/1994 | ......... | H01L/21/027 |
| JP | 8-79492 A | 3/1996 | | |
| JP | 2001036699 A | * 2/2001 | ............ | H04N/1/19 |

* cited by examiner

*Primary Examiner*—Diane I. Lee
(74) *Attorney, Agent, or Firm*—Foley & Lardner LLP

(57) ABSTRACT

A scanner unit is provided, which can make the amounts of light directed to a read line from the opposite sides of the optic axis plane substantially the same, thereby preventing a shade due to an edge of an attachment portion on a document form occurring.

In the scanner unit of the present invention, the carriage mirror 23 and the second carriage 12 of the optical reading device read a document by scanning read lines LL on the document in the scanning direction (R, F) and using light reflected from the document along an optic axis plane PP which contains the read line and extends in perpendicular relation to a document glass table. An exposure lamp 21 and a reflector 22 forming an illumination device illuminate the read line from both sides of the optic axis plane with the light passing along light path L10, L11 and the light passing along light path L20, L21, respectively. An light amount adjusting member, e.g., a filter 25, reduces the amount of light passing along the light path L10, L11 so that the amounts of illumination light directed from both sides of the optic axis plane are made substantially the same at the read line, thereby preventing a shade when reading an edge of an attachment portion on the document.

4 Claims, 5 Drawing Sheets

OPTICAL READER

BACKGROUND OF THE INVENTION

1. Field of the Invention

The present invention relates to an optical reader (referred to as "scanner unit" hereinafter) adapted for use in a copier, an image forming apparatus, etc., and more specifically to a scanner unit for reading a document by scanning direction which is perpendicular to the read lines and using light emitted by an illumination device to a read line and reflected from the document along an optic axis plane which contains the read line and extends in perpendicular to the document glass table.

2. Description of the Related Art

FIG. 5 is a cross-sectional view of a conventional scanner unit as seen from the front side thereof and FIG. 6 is an enlarged cross-sectional view illustrating the illumination device of the first carriage of the scanner unit in FIG. 5. In the scanner unit 100 shown in FIG. 5, first and second carriages 51, 52 are mounted on a rail (not shown in the drawings) for movement in the scanning direction as indicated by arrow F or R over the range of a predetermined distance in parallel to the document glass table 55 while maintaining a predetermined spaced interval with respect to a document glass table 55. The first and second carriages 51, 52 are driven to move by a wire 53 and a drive pulley 54 which is in turn driven by a belt and a drive motor (not shown). In such a structure of the scanner unit 100, it is so arranged that the first carriage 51 is movable over such a distance that the entire surface of a document 56 placed on the document glass table 55 is scanned from one outer edge SA thereof (or the terminating end of the document as viewed in the arrow direction R) to the other outer edge SZ thereof (or the terminating end of the document as viewed in the arrow direction F).

For the first carriage 51 to read the document 56 placed on the document glass table 55 along read lines LL (imaginary straight lines spaced at an appropriate interval for the reading), an illumination device is provided for illuminating the read lines LL. The illumination device includes an exposure lamp 61 and a reflector 62, and the light reflected from the read lines LL is directed to a carriage mirror 63 along the optic axis plane PP (also called optic axis, referring to a plane that passes through a read lines LL in a perpendicular relation to the document glass table 55). The carriage mirror 63 reflects its received reflected light to the second carriage 52, which reads such reflected light and sends it as data to a lens (not shown) for image formation or other purposes.

In the above-described conventional scanner unit, wherein the document placed on the document glass table is illuminated along the read line LL, the read line LL is illuminated from one side of the optic axis plane PP by direct light from the exposure lamp while it is illumined from the other side by light of the exposure lamp reflected by the reflector. In such a case, the amount of the reflected light (the amount of light passing through a unit area, or brightness) is lessened as compared with that of the direct light because the light directed to the read line LL for illumination thereof by way of the reflector has a longer distance to travel and for other reasons. A difference in the amount of illumination light directed from one side of the optic axis plane PP and the other side thereof causes a problem in the result of image formation. That is, if the document 56 has an attachment portion 56a, as shown in FIG. 7, a shade 56b results from the stepped edge of the attachment portion 56a when the edge of the attachment portion 56a is positioned at a read line LL or coincides with the optic axis plane PP.

Though it may be contemplated to provide exposure lamps on both sides of the optic axis plane for preventing an occurrence of shade, this cannot provide a practical solution in terms of cost because two sets of illumination devices each including an exposure lamp and an inverter must be used and hence the cost of the illumination devices becomes high as compared with the use of a reflector. There has been a proposal to arrange inline type LEDs or the like on both sides of the optic axis plane for illumination instead of exposure lamp and to remove the shade by image processing (Japanese Patent Application KOKAI Publication No. H8-79492), but devices used in such proposed arrangement are complicated and costly and the control program therefor is also complicated.

SUMMARY OF THE INVENTION

The present invention has been made in order to solve the above problems, and its object is to provide a scanner unit which can make the amounts of light directed to the read line from the opposite sides of the optic axis plane substantially the same by using a single unit of conventional illumination device and simple and inexpensive members, thereby preventing a shade at the edge of an attachment portion on a document when reading the document having such attachment portion.

In order to solve the aforementioned problems, the present invention provides a optical reader comprising an optical reading device for reading a document by scanning read lines on the document placed on a document glass table in the scanning direction which is perpendicular to the read lines and using light reflected from the document along an optic axis plane which contains a read line of said read lines and extends in perpendicular relation to the document glass table, an illumination device for illuminating the read lines from both sides of said optic axis plane, and a light amount adjusting member for adjusting such that the amounts of light illuminated from both sides of said optic axis plane are substantially the same at the read line.

In so constructing, because the amounts of light directed to the read line from the opposite sides of the optic axis plane can be made substantially the same through adjustment by the light amount adjusting member, a shade will not result from reading the edge of an attachment portion on a document.

In the present invention, the illumination device includes an exposure lamp emitting illumination light toward said read line from one side of said optic axis plane along a first light path and illumination light toward the other side of said optic axis plane along a second light path, and a reflector member reflecting said illumination light emitted toward the other side of said optic axis plane along said second light path toward said read line along a third light path. Thus, the illumination device using a conventional member can be constructed with ease.

In the present invention, the light amount adjusting member may include a half mirror member which directs the light emitted by said exposure lamp toward said read line along said first light path while reducing the amount of such light and reflects part of the light emitted by said exposure lamp along said first light path toward said reflector member so that said part of the light is further reflected by said reflector member toward said read line. Because the light mount-adjusting member is provided by a single half mirror member, it is inexpensive and simple in structure.

In the present invention, the light amount adjusting member may include a filter member which directs the light emitted by said exposure lamp toward said read line along said first light path while reducing the amount of such light. The use of the filter member is advantageous in terms of cost and, as compared with the use of the half mirror member, the light amount-adjusting member can be made still simpler because reflection of illumination light passing along the first light path is not used.

In the present invention, the light amount adjusting member may include light transmissivity reducing means which is formed partially in a glass tube of said exposure lamp so that part of said glass tube has a reduced light transmissivity and allows the light emitted by said exposure lamp to be directed toward said read line along said first light path while reducing the amount of such light. If the light transmissivity reducing means is formed in the glass tube, the number of parts for use can be reduced, while if the light transmissivity reducing means is made of any other member, mounting thereof can be done easily.

DESCRIPTION OF THE PREFERRED EMBODIMENTS

Figure 1:
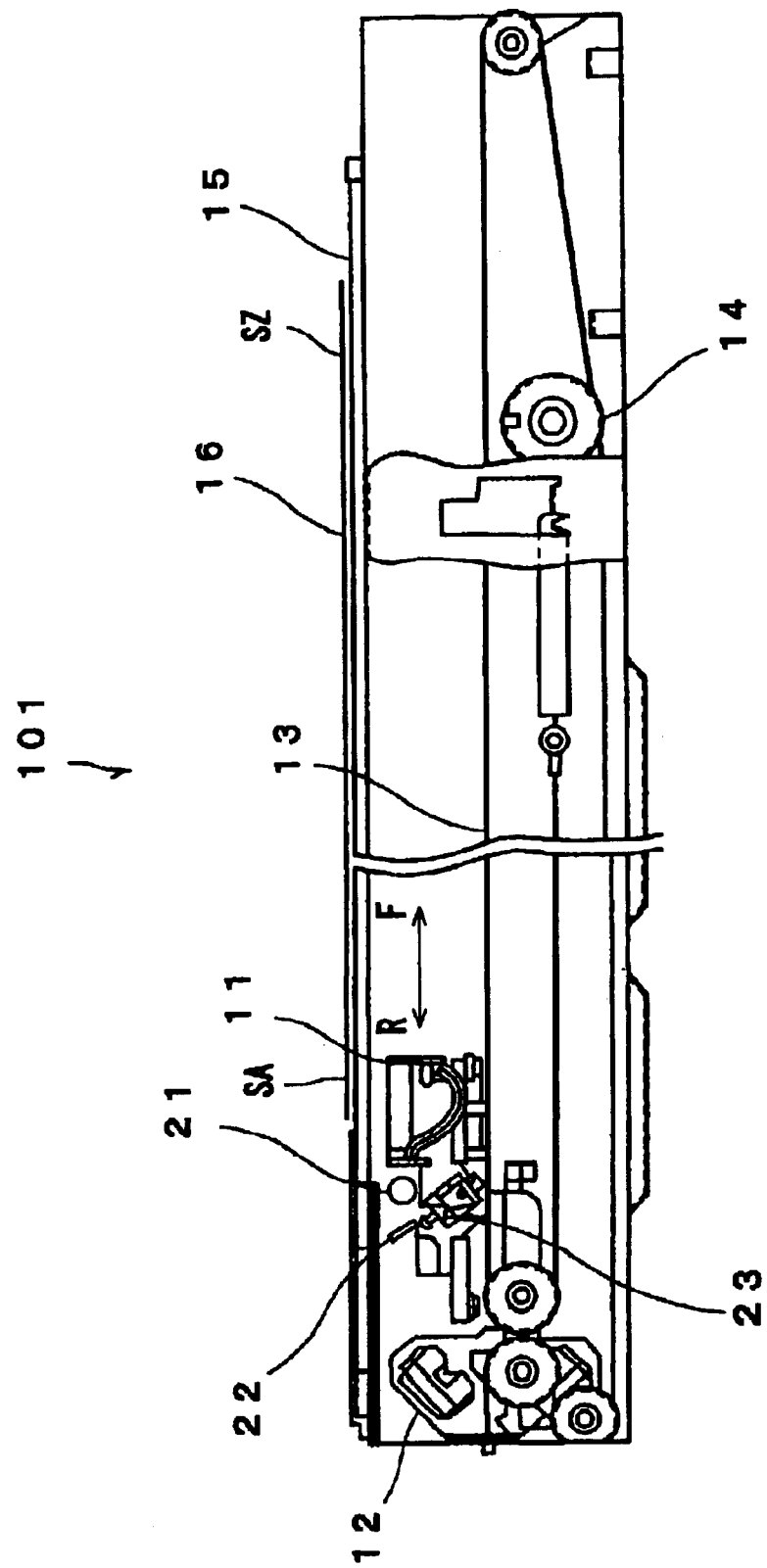
FIG. 1 is a cross-sectional view of the embodiment 1 of the scanner unit of the present invention as seen from the front side thereof.
Figure 2:
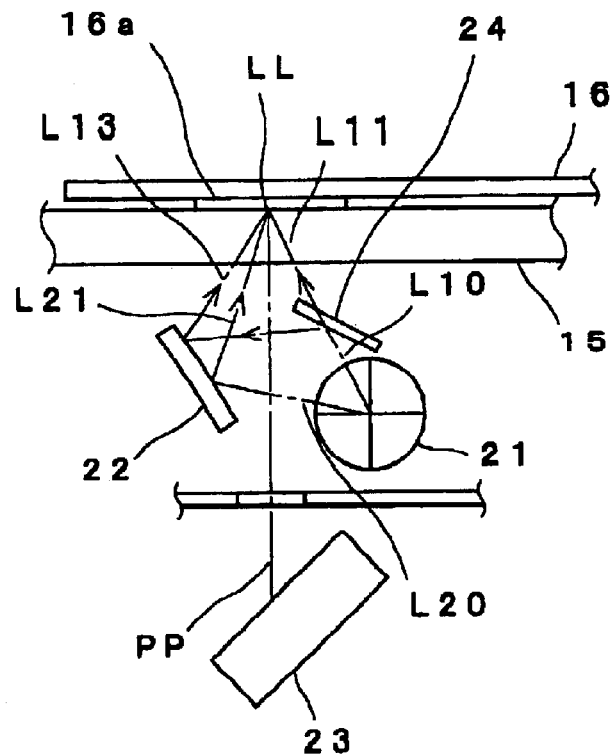
FIG. 2 is an enlarged cross-sectional view illustrating an illumination device of the first carriage in the scanner unit of FIG. 1.
Figure 3:
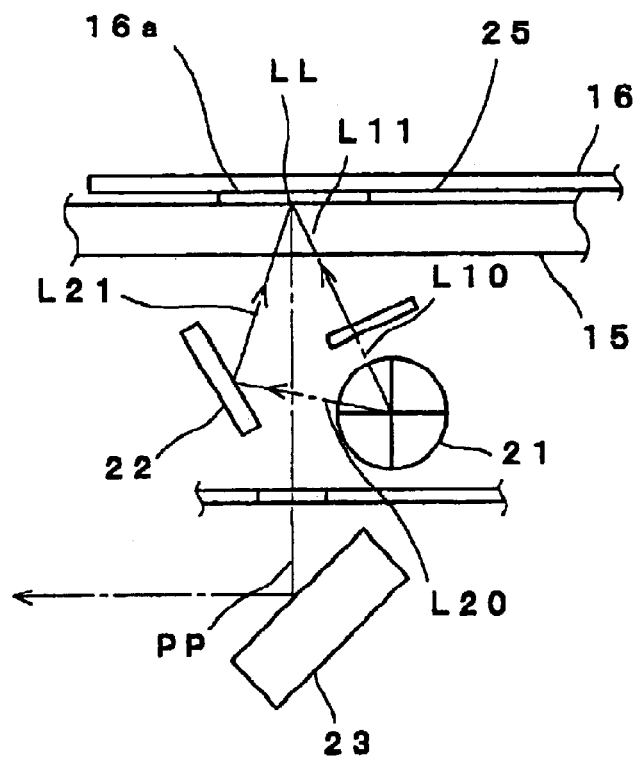
FIG. 3 is an enlarged cross-sectional view illustrating an illumination device used in the embodiment 2 of the present invention.
Figure 4A:
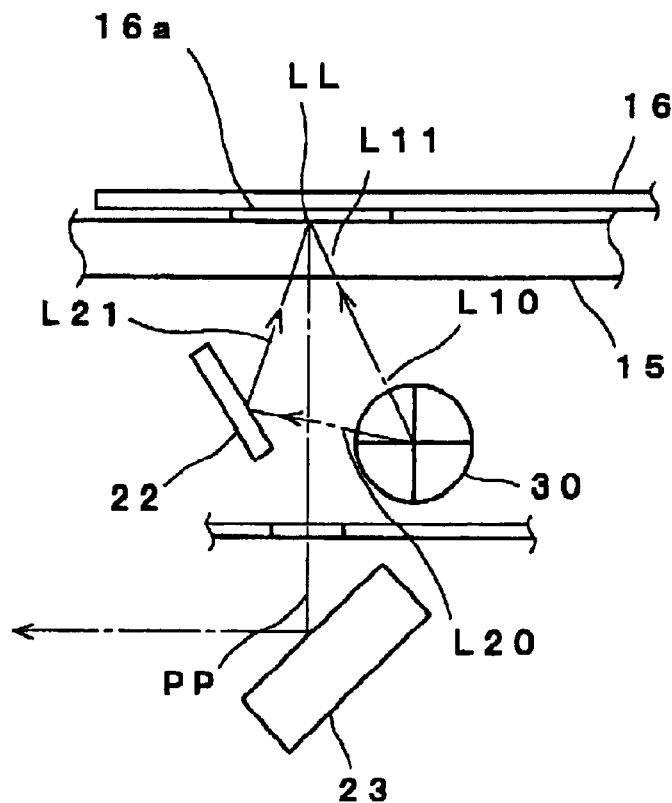
FIG. 4(A) is an enlarged cross-sectional view illustrating an illumination device used in the embodiment 3 of the present invention.
Figure 4B:
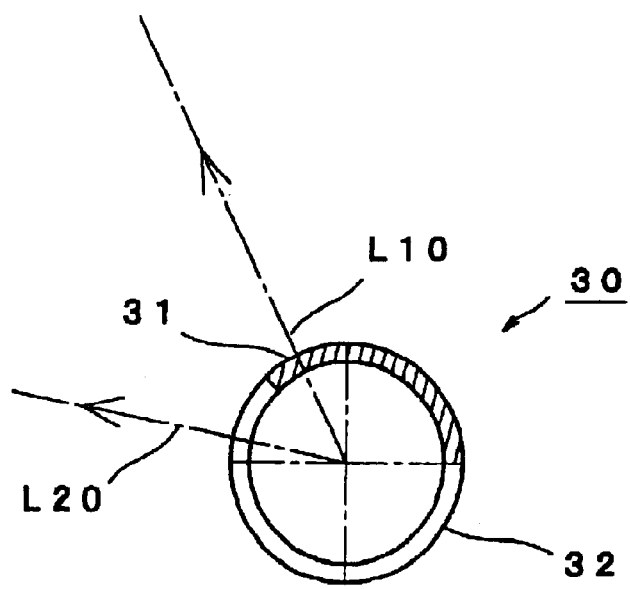
FIG. 4(B) is a view explaining in detail an illumination lamp used in the illumination device of FIG. 4(A)
Figure 5:
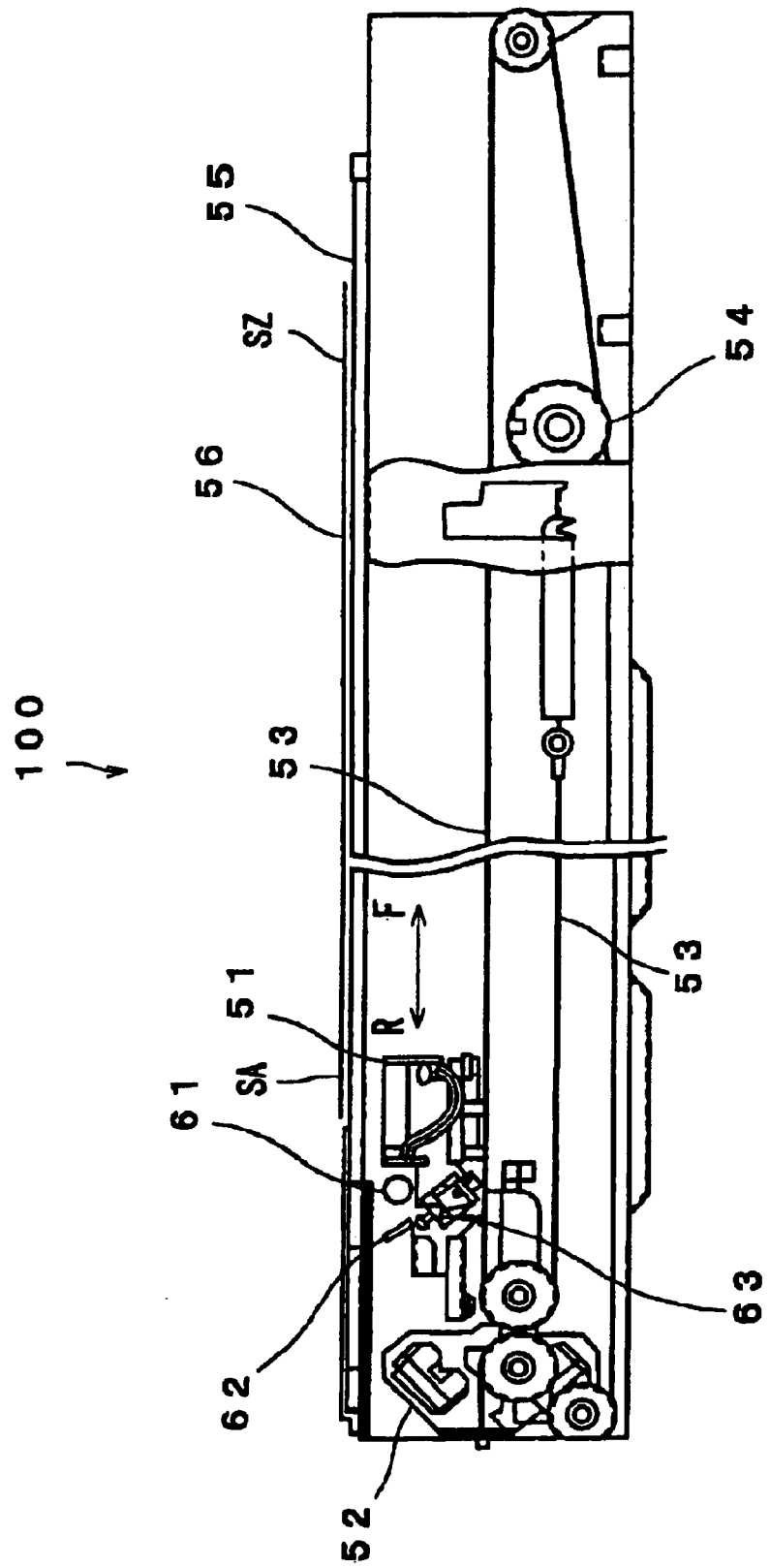
FIG. 5 is a cross-sectional view of a conventional scanner unit as seen from the front side thereof.
Figure 6:
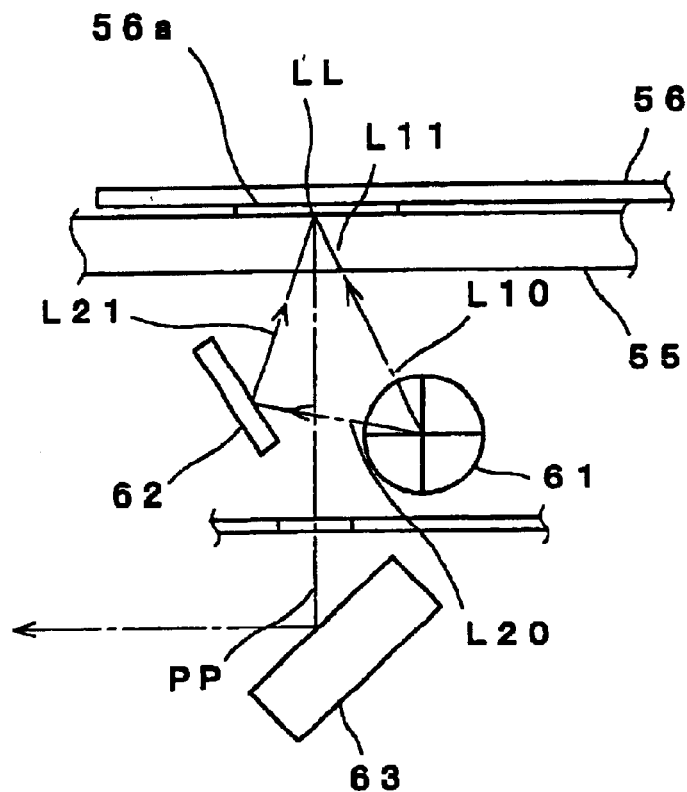
FIG. 6 is an enlarged cross-sectional view illustrating the illumination device of the first carriage in the scanner unit of FIG. 5.
Figure 7:
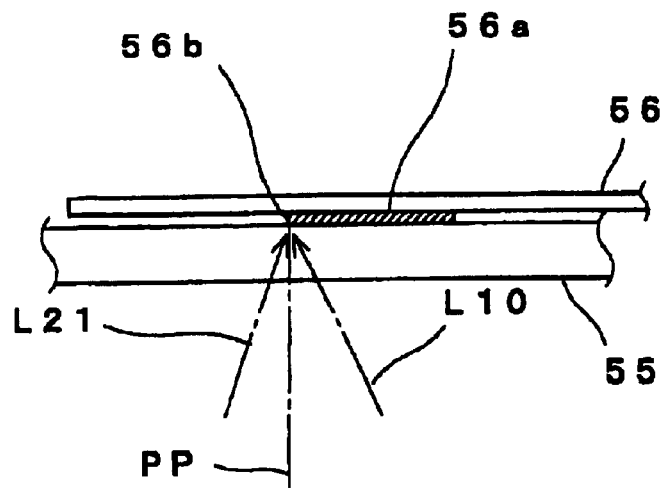
FIG. 7 is a view illustrating the occurrence of a shade during reading of a document.

The following will describe the preferred embodiments of the present invention with reference to the accompanying drawings. FIG. 1 is a cross-sectional view of the embodiment 1 of the scanner unit of the present invention as seen from the front thereof, FIG. 2 is an enlarged cross-sectional view illustrating the illumination device of the first carriage in the scanner unit of FIG. 1, FIG. 3 is an enlarged cross-sectional view illustrating the illumination device used in the embodiment 2 of the present invention, FIG. 4(A) is an enlarged cross-sectional view illustrating the illumination device used in the embodiment 3 of the present invention, and FIG. 4(B) is a detailed view of the illumination lamp used in the illumination device of FIG. 4(A).

Embodiment 1

In the scanner unit 101 shown in FIG. 1, first and second carriages 11, 12 are mounted on a rail (not shown) for movement in the scanning direction as indicated by arrow F or R over the range of a predetermined distance in parallel to the document glass table 15 while maintaining a predetermined spaced interval with respect to the document glass table 15. The first and second carriages 11, 12 are driven to move by a wire 13 and a drive pulley 14 which is in turn driven by a belt and a drive motor (not shown). In such a structure of the scanner unit 101, it is so arranged that the first carriage 11 is movable over such a distance that the entire surface of a document 16 placed on the document glass table 15 is scanned from one outer edge SA thereof (or the terminating end of the document as viewed in the arrow direction R) to the other outer edge SZ thereof (or terminating end of the document as viewed in the arrow direction F).

For the first carriage 11 to read the document 16 placed on the document glass table 16 along read lines LL (imaginary linear lines spaced at an appropriate interval for the reading), there is provided an illumination device for illuminating the read lines LL. The illumination device includes an exposure lamp 21, a reflector 22 and a half mirror 24, and the light reflected from the read lines LL are directed to a carriage mirror 23 along the optic axis plane PP (also called optic axis, referring to a plane that passes through a read lines LL in a perpendicular relation to the document glass table 15). The carriage mirror 23 reflects the received reflected light to the second carriage 12, which reads such reflected light and sends it to a lens (not shown). The light transmitted by way of the carriage mirror 23 and the second carriage 12 and the lens which constitute the component elements of an optical reading device of the present invention are provided for image formation or other purposes. It is noted that, since the scanner unit in FIG. 1 is shown in cross-section as seen from the front of the scanner unit, the exposure lamp 21, the reflector 22, the carriage mirror 23 and the half mirror 24 are provided extending perpendicularly to the plane of the drawing and the wire 13 and the drive pulley 14 are provided on both front and rear sides of the scanner unit.

As shown in FIG. 2, the exposure lamp 21 of the illumination device is disposed on the side of the arrow F (FIG. 1) with respect to the optic axis plane PP, while the reflector 22 is disposed on the side of the arrow R with respect to the optic axis plane PP. The half mirror 24 is disposed in the light path L10 of the light from the exposure lamp 21 directed toward a read line LL. The light emitted by the exposure lamp 21 and directed along the light path L10 is splitted into, on one hand, a light passing through the half mirror 24 and directed toward the read line LL along a light path 11 which is an extension of the light path L10, and on the other hand, a light reflected by the half mirror 24 and directed toward the reflector 22 along the light path L12. The light passing along the light path 12 is reflected by the reflector 22 and directed toward the read line LL by way of the light path L13.

On the other hand, the light from the exposure lamp 21 passing along the light path L20 is reflected by the reflector 22 and directed toward the read line LL along the light path L21. The light passing along the light path L13 and the light passing along the light path L19 converge at the read line LL and the converged light has substantially the same brightness as the light passing along the light path L11. Because the read line LL is illuminated from both sides of the optic axis plane PP with substantially the same amount of light (the amount of light passing through a unit area, or brightness), a shade will not occur at the edge of the attachment portion 16a if any such attachment portion is present on the document 16. Illumination of the read line LL by the same amount of light from the side of the arrow F and the side of the arrow R with respect to the optic axis plane PP can be accomplished easily by appropriately setting the ratio between the amount of light passing through the half mirror 24 and the amount of light reflected therefrom. In this embodiment, improvement can be made merely by adding a single half mirror in the conventional structure of scanner unit, so that the structural change is simple and the half mirror is readily available with a small cost and, therefore, this is advantageous in terms of cost.

Embodiment 2

The following will describe the embodiment 2 of the scanner unit of the present invention with reference to FIG. 3. In this embodiment, a filter 25 is used in place of the half mirror 24 of FIG. 2. The amount of light emitted by the exposure lamp 21 along the light path L10 is reduced when the light passes through the filter 25, and the light is then directed along the light path L11 toward a real line LL. On the other hand, the light emitted by the exposure lamp 21 along the light path L20 is reflected by the reflector 22 to be directed along the light path L21 toward the real line LL. In this case, the filter 25 has such a transmissivity with respect to the light from the exposure lamp 21 that the amount of light passed through the filter 25 is substantially the same at the read line LL as the amount of light passed along the light path L21. Therefore, as in the case of FIG. 2, a shade will not occur at the edge of the attachment portion 16a if any such attachment portion is present on the document 16. Though, in the case of FIG. 2, the light passing along the light paths L12, L13 must be reflected twice by the half mirror and the reflector for adjusting the amount of light, the embodiment of FIG. 3 is advantageous in that the amount of light can be adjusted merely by allowing the light to pass through the filter without reflection and, therefore, the adjustment is easy.

Embodiment 3

The following will describe the embodiment 3 of the scanner unit of the present invention with reference to FIG. 4. As shown in FIG. 4(A), the exposure device of this scanner unit uses an exposure lamp 30 which has incorporated therein a filter function in place of the filter 25 of FIG. 3. In this embodiment, intensity of the light emitted by the exposure lamp 30 along the light path L10 is reduced to be lower than that of the light emitted along the light path L20. That is, a glass tube that forms a part of the exposure lamp 30 is treated appropriately so as to have a low transmissivity portion 31 and a high transmissivity portion 32, as shown in FIG. 4(B). The amount of light passing through the low transmissivity portion 31 is reduced to be lower than the amount of light passing through the high transmissivity portion 32 to such an extent that the amount of light passing along the light path L10 and the amount of light passing along the light paths L20, L21 are substantially the same at the read line LL. Various surface treatments are available for formation of the low transmissivity portion 31 or, alternatively, a film having a filter function may be attached to the glass tube. Surface treatment is advantageous in that the number of parts can be reduced, while the film is advantageous over the half mirror or the filter in that film mounting can be done easily.

In the above-described embodiments, the amounts of light directed from both sides of the optic axis plane for illumination of the read line can be substantially equalized merely by using only one set of illumination device. In addition, this equalizing can be performed easily and hence less costly because a half mirror, a filter or a glass tube is used as the equaling member. Though complicated in structure as compared with the above described-embodiments, another method may be contemplated which can offer the same effect. For example, the aforementioned reflector may be formed so as to have a plurality of reflection surfaces (for example, two or three such surfaces) so that each reflection surface reflects the light toward the read line and that the amounts of illumination light from both sides of the optic axis plane are substantially equalized. Because this method requires reflector of a complicated structure, however, the adjustment in this method for illuminating a read line having a predetermined width with the equalized amounts of light is not easy as compared with the foregoing embodiments, As is apparent from the foregoing description of the embodiments of the scanner unit of the present invention, by providing a light amount adjusting member for adjusting so as to substantially equalize the amounts of light emitted by the illumination device toward the read line from both sides of the optic axis plane, a shade will not occur at the edge of an attachment portion during reading such edge if any such attachment portion is present on the document. Such illumination device which is comprised of an ordinary exposure lamp and reflector is readily available and hence inexpensive. The light amount-adjusting member which can be comprised of a single half mirror is advantageous in terms of cost and simple structure. Additionally, the light amount adjusting member comprised of a single filter is still simpler than the above structure which uses the half mirror because the light passing along the first light axis does not have to be reflected. Using an exposure lamp made of a glass tube part of which has a low light transmissivity in stead of the filter is advantageous because the number of parts for use can be reduced.

What is claimed is:

1. An optical reader comprising:
   an optical reading device for reading a document by scanning read lines on the document placed on a document glass table in a scanning direction which is perpendicular to the read lines and using light reflected from the document along an optic axis plane which contains a read line of said read lines and extends in perpendicular to the document glass table;
   an illumination device for illuminating the read lines from both sides of said optic axis plane; and
   a light amount adjusting member for adjusting such that the amounts of light illuminated from both sides of said optic axis plane are substantially the same at the read line,
   wherein said illumination device includes an exposure lamp emitting illumination light toward said read line from one side of said optic axis plane along a first light path and illumination light toward the other side of said optic axis plane along a second light path, and a reflector member reflecting said illumination light emitted toward the other side of said optic axis plane along said second light path toward said read line along a third light path.

2. An optical reader according to claim 1, wherein:
   said light amount adjusting member includes a half mirror member which directs the light emitted by said exposure lamp toward said read line along said first light path while reducing the amount of such light and reflects part of the light emitted by said exposure lamp along said first light path toward said reflector member so that said part of the light is further reflected by said reflector member toward said read line.

3. An optical reader according to claim 1, wherein:

said light amount adjusting member includes a filter member which directs the light emitted by said exposure lamp toward said read line along said first light path while reducing the amount of such light.

4. An optical reader according to claim 1, wherein:

said light amount adjusting member includes a glass tube of said exposure lamp, part of said glass tube having a reduced light transmissivity and allowing the light emitted by said exposure lamp to be directed toward said read line along said first light path while reducing the amount of such light.

* * * * *